(12) United States Patent
Spencer

(10) Patent No.: US 8,646,718 B2
(45) Date of Patent: Feb. 11, 2014

(54) FLEXIBLE CONDUIT STORAGE DEVICE

(76) Inventor: Cameron Nicholas Spencer, Melbourne (AU)

( * ) Notice: Subject to any disclaimer, the term of this patent is extended or adjusted under 35 U.S.C. 154(b) by 633 days.

(21) Appl. No.: 12/753,911

(22) Filed: Apr. 5, 2010

(65) Prior Publication Data

US 2010/0264244 A1 Oct. 21, 2010

(30) Foreign Application Priority Data

Apr. 16, 2009 (AU) ................................. 2009901613

(51) Int. Cl.
*B65H 75/48* (2006.01)
(52) U.S. Cl.
USPC ......... 242/385.4; 242/402; 242/404; 242/379
(58) Field of Classification Search
USPC ........... 242/371, 376, 376.1, 378, 378.1, 379, 242/385, 385.4, 388, 388.1, 396, 396.1, 242/396.2, 402, 404–404.3, 405, 406, 588.1
See application file for complete search history.

(56) References Cited

U.S. PATENT DOCUMENTS

| | | | | |
|---|---|---|---|---|
| 4,286,387 A | * | 9/1981 | Di Diego | 33/769 |
| 6,015,110 A | * | 1/2000 | Lai | 242/388.1 |
| 7,850,113 B1 | * | 12/2010 | Barkley | 242/388.1 |
| 2005/0242223 A1 | * | 11/2005 | Woodward | 242/376 |
| 2012/0012689 A1 | * | 1/2012 | Alden | 242/376 |

* cited by examiner

*Primary Examiner* — William E Dondero
(74) *Attorney, Agent, or Firm* — Kunzler Law Group, PC

(57) ABSTRACT

The present invention relates to a device for storing a flexible conduit, such as an electrical cord of a set of personal head phones or similar. The device has a body and a drum rotationally coupled to the body. The drum is biased to rotate in a first direction. A latch movable between a latched position and an unlatched position prevents rotation of the drum in the first direction when the latch is in the latched position. The body has an opening for positioning a portion of flexible conduit. At least one coupling disposed on the drum extends into the opening for catching a portion of a flexible conduit positioned within the opening. When the latch is in the unlatched position the drum rotates in the first direction to cycle the coupling through the opening. A coupling catches a flexible conduit positioned within the opening to wind the flexible conduit onto the drum.

39 Claims, 13 Drawing Sheets

FLEXIBLE CONDUIT STORAGE DEVICE

FIELD OF THE INVENTION

The present invention relates to a device for storing a flexible conduit, such as an electrical cord of a set of personal head phones or similar.

BACKGROUND TO THE INVENTION

When using or storing flexible conduits such as electrical wires or hydraulic conduits, excess conduit length can become tangled or difficult to manage. Excess conduit length is often left lying on the ground in an untidy state, or becomes a hindrance to the user when being used. Therefore a storage device that stores flexible conduits is desirable, to prevent tangling, help maintain the conduit in good condition, and allow the conduit to be managed more easily.

In this specification where reference has been made to patent specifications, of her external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide an improved storage device for storing a flexible conduit, or to at least provide the public with a useful choice.

SUMMARY OF THE INVENTION

In one aspect, the present invention broadly consists in a device for storing a flexible conduit, the device comprising:
a body,
a drum rotationally coupled to the body and biased to rotate in a first direction,
a latch movable between a latched position and an unlatched position, wherein in the latched position the drum is prevented from rotating in the first direction,
an opening in the body for positioning a portion of flexible conduit,
at least one coupling disposed on the drum, the coupling adapted to extend into the opening for catching a portion of a flexible conduit positioned within the opening, and when the latch is in the unlatched position the drum rotates in the first direction to cycle the coupling through the opening, a said coupling catching a flexible conduit positioned within the opening to wind the flexible conduit onto the drum.

Preferably the opening is at an edge of the body and extends through the body from one side of the body to another side of the body.

Preferably the opening allows a pathway for a flexible conduit to pass substantially parallel to the drum axis across the path of the couplings as the drum rotates.

Preferably the at least one coupling is a tine extending radially from an outer circumference of the drum.

Preferably the leading edge of the tine is sloping forward in the direction of the first rotational direction.

Preferably there are a plurality of couplings spaced apart around an outer circumference of the drum.

Preferably in use a flexible conduit is wound onto an outer circumference of the drum on which the at least one coupling is disposed.

Alternatively the drum includes a flange extending radially from a side of the drum, the at least one coupling being attached to the flange at a radial position intermediate between a drum outer surface and a circumferential perimeter of the drum.

Preferably the at least one coupling extends in an axial direction from the flange towards an opposite side of the drum distal from the flange.

Preferably the at least one coupling has a curved surface for catching a portion of a flexible conduit, the curved surface facing forwards in the first direction of rotation.

Preferably the at least one coupling includes a lip at an end of the coupling distal from the flange, the lip adapted to assist with maintaining engagement of a portion of a flexible conduit with a said coupling.

Preferably the device includes a plurality of couplings, the couplings being spaced apart circumferentially around the flange.

Preferably the opening is at an edge or perimeter of the body and extending through one side of the body.

Preferably the latch is a ratchet comprising a pawl movably attached to the body and a plurality of drum teeth located around an inner circumferential perimeter of the drum, the pawl engaging with the drum teeth when in the latched position.

Preferably the latch is a ratchet comprising a pawl and corresponding drum teeth, the pawl engaging with the drum teeth when in the latched position, the pawl being integrally formed with a movable portion of the body, the movable portion being a cantilever bending about a bend region, the pawl being at an end of the cantilever distal from the bend region.

Preferably the drum is radially supported by a cylindrical surface, and the movable portion has an outer diameter substantially coterminous with the cylindrical surface.

Preferably an inside circumferential surface of the drum is radially supported by a cylindrical surface extending from the body, the inside circumferential surface being an inner circumferential side of the drum teeth.

Preferably the drum is radially supported by the outside diameter of the movable portion when the movable portion and pawl are deflected further into the drum when being moved from the latched position to the unlatched position.

Preferably the latch is biased to the latched position.

Preferably the pawl engages with the drum teeth on an engagement plane, the engagement plane being normal to the drum axis of rotation Preferably the pawl is adapted to move axially with respect to the drum access for movement between the latched and unlatched positions.

Preferably in use an intermediate portion of a flexible conduit engages with a said coupling, the flexible conduit doubling around said coupling and the doubled up flexible conduit being wound onto the drum as the drum rotates in the first direction of rotation.

Preferably when rotating in the first direction, a said coupling engages with a flexible conduit positioned within the opening, the flexible conduit initially hitting leading edges of the opening double the flexible conduit around the coupling and automatically draw the flexible conduit onto the drum.

Preferably the drum is biased in the first direction of rotation by a coil spring, a position of the coil spring being fixed to the drum and another position of the coil spring being fixed to the body.

Preferably a portion of the coil spring resides within the drum.

Preferably the pawl is movably coupled to a side part of the body, and the coil spring is fixed to the same side part of the body.

Preferably the drum in a direction opposite to the first direction pre-tensions the coil spring.

Preferably a flexible conduit is unwound from the drum by pulling the flexible conduit from the storage device to rotate the drum in a direction opposite to the first direction thereby re-tensioning the coil spring for subsequent use.

Preferably the body is adapted to attach to a clip plate, the clip plate adapted for attachment to a user's clothes or another device.

Preferably the body attaches to the clip plate by rotational engagement.

Preferably the clip plate attaches to the body via at least two clip sections, each clip section extending circumferentially from the clip plate about a first centre point, and
- the body having a plurality of holes, each said hole being spaced a part circumferentially and centred about a second centre point and arranged into pairs, and
- in use the first and second centre points being aligned to align a clip section with a corresponding pair of holes for engagement.

Preferably the device is adapted to store a flexible conduit that is separate from the device.

Preferably the body has two side parts spaced apart by columns.

Preferably the body has an open perimeter between two side parts except for the columns located at or near the perimeter of the body.

Preferably the body has four corner columns.

Preferably an inside surface of each column is curved, the inside curved surface of the four columns having a common centre of curvature, the drum rotation being centred on the common centre of curvature.

Preferably the body is a housing and the drum is rotationally coupled within the housing.

In a second aspect, the present invention broadly consists in a device for storing a flexible conduit, the device comprising:
- a body,
- a latchable drum rotationally coupled to the body,
- one or more couplings disposed on the drum for catching a flexible conduit,
- a biasing element to bias the drum for rotation, and
- an opening in the body for exposing one or more said couplings for catching a flexible conduit positioned in the opening,
- wherein the drum can be latched to prevent rotation, and unlatched to allow rotation of the drum to cycle the couplings through the opening.

In a third aspect, the present invention broadly consists in a device for storing a flexible conduit, the device comprising:
- a body,
- a drum rotationally coupled to the body and biased to rotate in a first direction,
- a latch movable between a latched position and an unlatched position, wherein in the latched position the drum is prevented from rotating in the first direction,
- an opening in the body for positioning a portion of flexible conduit,
- a plurality of couplings disposed on the drum, the couplings adapted to extend into the opening for catching a portion of a flexible conduit positioned within the opening, and
- when the latch is in the unlatched position the drum rotates in the first direction to cycle the couplings through the opening, a said coupling catching a flexible conduit positioned within the opening to wind the flexible conduit onto the drum.

In a forth aspect, the present invention broadly consists in a device for storing a flexible conduit, the device comprising:
- a body,
- a drum rotationally coupled to the body and biased to rotate in a first direction,
- a latch movable between a latched position and an unlatched position, wherein in the latched position the drum is prevented from rotating in the first direction,
- an opening in the body for positioning a portion of flexible conduit,
- at least one coupling disposed on the drum, the coupling adapted to extend into the opening for catching a portion of a flexible conduit positioned within the opening, and
- when the latch is in the unlatched position the drum rotates in the first direction to cycle the coupling through the opening, a said coupling catching a flexible conduit positioned within the opening to wind the flexible conduit onto the drum,
- the opening being at an edge of the body and extending through the body from one side of the body to another side of the body to allow a pathway for a flexible conduit to pass substantially parallel to the drum axis across the path of the coupling as the drum rotates.

In a fifth aspect, the present invention broadly consists in a device for storing a flexible conduit, the device comprising:
- a body,
- a drum rotationally coupled to the body and biased to rotate in a first direction,
- a latch movable between a latched position and an unlatched position, wherein in the latched position the drum is prevented from rotating in the first direction,
- an opening in the body for positioning a portion of flexible conduit,
- at least one coupling disposed on the drum, the coupling adapted to extend into the opening for catching a portion of a flexible conduit positioned within the opening, and
- when the latch is in the unlatched position the drum rotates in the first direction to cycle the coupling through the opening, a said coupling catching a flexible conduit positioned within the opening to wind the flexible conduit onto the drum,
- the opening being at an edge of the body and extending through the body from one side of the body to another side of the body to allow a pathway for a flexible conduit to pass substantially parallel to the drum axis across the path of the coupling as the drum rotates,
- the at least one coupling being a tine extending radially from an outer circumference of the drum.

In a sixth aspect, the present invention broadly consists in a device for storing a flexible conduit, the device comprising:
- a body,
- a drum rotationally coupled to the body and biased to rotate in a first direction,
- a latch movable between a latched position and an unlatched position, wherein in the latched position the drum is prevented from rotating in the first direction,
- an opening in the body for positioning a portion of flexible conduit,
- at least one coupling disposed on the drum, the coupling adapted to extend into the opening for catching a portion of a flexible conduit positioned within the opening, and
- when the latch is in the unlatched position the drum rotates in the first direction to cycle the coupling through the opening, a said coupling catching a flexible conduit positioned within the opening to wind the flexible conduit onto the drum, the drum including a flange extending radially from a side of the drum, the at least one coupling being attached to the flange at a radial position intermediate between a drum outer surface and a circumferential perimeter of the drum, the opening being at an edge or perimeter of the body and extending through one side of the body.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples only.

BRIEF DESCRIPTION OF THE DRAWINGS

Preferred embodiments of the invention will be described by way of example only and with reference to the drawings listed below.

FIG. 1b is a perspective view of the flexible conduit storage device of FIG. 1a.

DETAILED DESCRIPTION

Figure 1A:
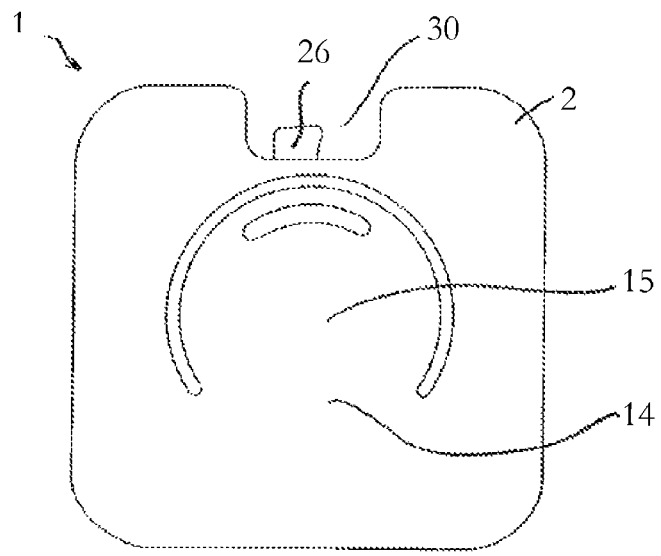
FIG. 1a is a front view of a flexible conduit storage device according to one embodiment of the present invention.

The present invention will generally be described in relation to a storage device for storing the flexible electrical cord of a set of personal head phones. However, the present invention may equally be applied to a storage device for storing other flexible conduits. For example, storage devices according the present invention may be adapted to store flexible electrical power or communication cables such as personal computer power cords or data cables, or flexible hydraulic conduits such as garden hoses or catheters, or pneumatic lines such as pneumatic workshop hoses.

Referring to FIGS. 1 and 3 to 9, one embodiment is described. A drum component 5 is housed or supported by a main body such as a housing or frame 2. The drum is rotationally coupled to the body. The body 2 is preferably formed in two side parts 3 and 4. The body preferably has an open perimeter 10 except for a number of posts or columns extending between the two sides 3 and 4. Preferably the sides 3 and 4 of the body 2 are spaced apart by four corner columns 11. Alternatively the perimeter or edge 10 may be closed except at the opening 30. Preferably the opening is at one edge of the body, extending through the body from one side of the body to the other side of the body. The opening may be formed, for example, as a notch in each side of the body, the notches being aligned, with the perimeter or edge of the body being open between the notches.

Each corner column 11 is preferably formed in two parts, each part being integrally formed with one side 3, 4 of the body 2. Alternatively, each column may be integrally formed with one side 3, 4 of the body 2. An inside surface 9 of each column is preferably curved, the curved inside surface of the columns sharing a common radius and centre of curvature. The drum is centered on the same centre of curvature.

Figure 3A:
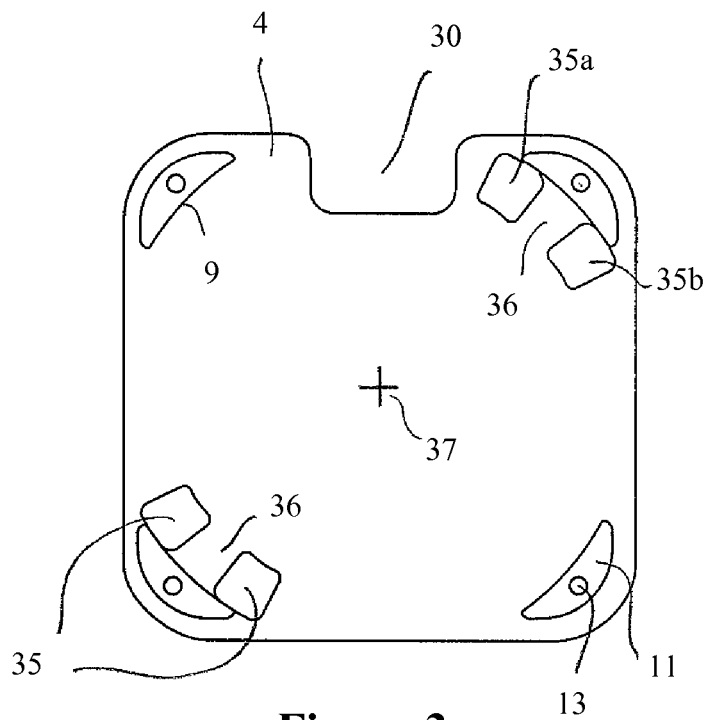
FIG. 3 is a partly assembled view of the flexible conduit storage device of FIG. 1.
Figure 3B:
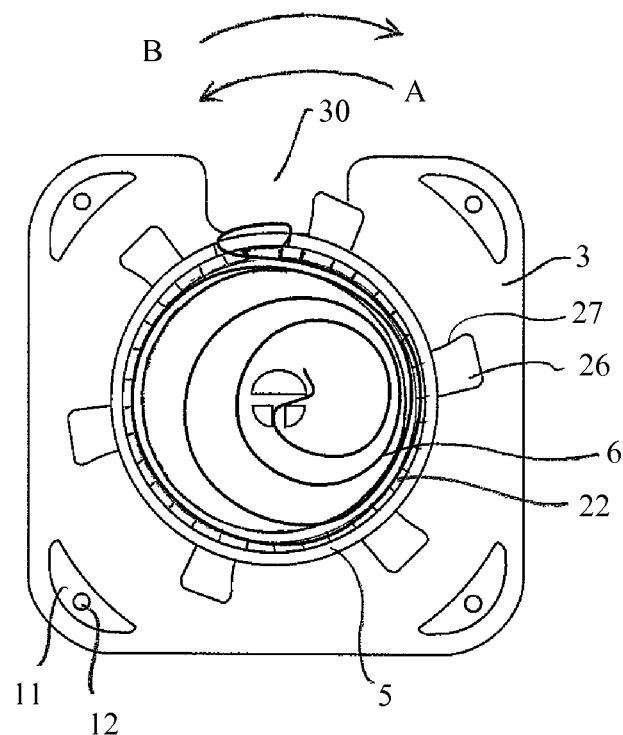
Figure 4A:
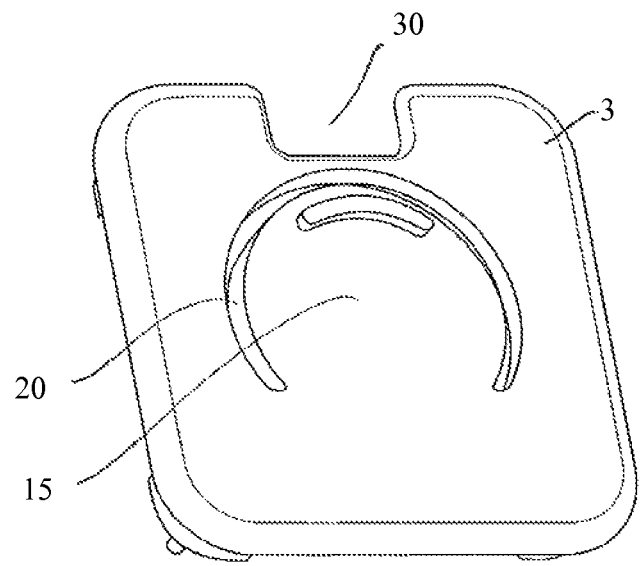
FIG. 4a is a perspective view showing the outside surfaces of a front half of a body of the flexible conduit storage device of FIG. 1.
Figure 4B:
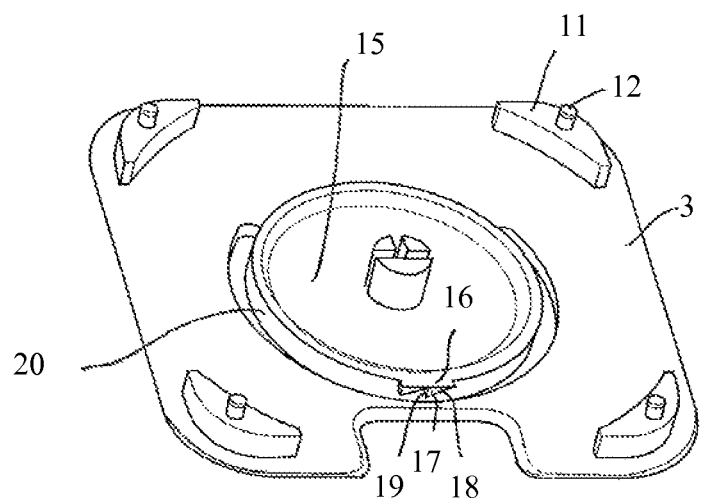
FIG. 4b is a perspective view showing the inside surfaces of a front half of a body of the flexible conduit storage device of FIG. 1.

The two sides 3, 4 are preferably held together by pegs 12 on one side 3, 4 of the body and corresponding holes 13 in the other side 3, 4 of the body. Preferably one peg 12 is located at each column portion 11 of a side 3, 4 of the body, and a corresponding hole 13 being located in the corresponding column portion 11 of the other side 3, 4 of the body, as best shown in FIGS. 3A and 3B. Adhesive may be used to permanently fix the two halves 3, 4 together.

Figure 5A:
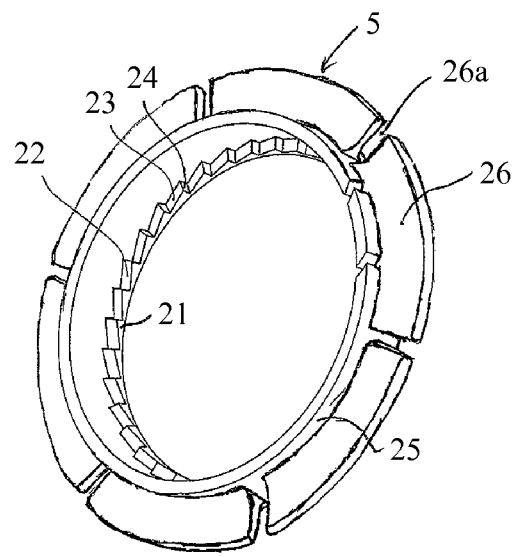
FIG. 5a is a perspective view of a drum component from the flexible conduit storage device of FIG. 1.
Figure 5B:
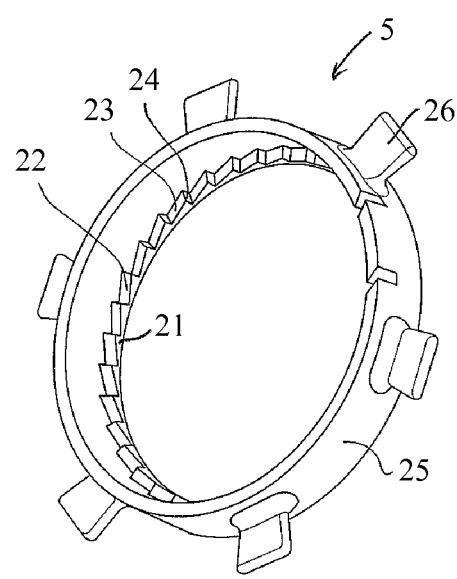
FIG. 5b is a perspective view of an alternative drum component from a flexible conduit storage device according to the present invention

Referring to FIG. 5, the drum 5 is generally an open cylinder. Alternatively, the drum cylinder may be closed at one end. An inside surface 21 of the drum cylinder is radially supported by cylindrical surface 20 (see FIG. 4B). Cylindrical surface 20 extends from the inner surface of one side 3, 4 of the body 2. Drum 5 is adapted to rotate freely on cylindrical surface 20, drum inside surface 21 bearing on cylindrical surface 20.

A tensioned biasing element 6 biases the drum to rotate in one direction. The biasing element is preferably a coil spring 6, one position of the coil spring being fixed to the drum and another position of the coil spring being fixed to the body. Preferably the spring is fixed to the same side 3 of the body from which the cylindrical surface 20 extends to assist with assembly of the drum to the body.

The drum is biased to rotate in a first direction under the action of the tensioned spring 6 unwinding. The first direction is indicated in FIG. 3B by arrow A. Rotating the drum in an opposite direction as indicated by arrow B in FIG. 3B winds or pretensions the spring ready for unwinding in the first direction of rotation.

A latch is operable to prevent rotation of the drum in the first direction of rotation, that is, the biased direction of rotation. The latch is movable between a latched position and an unlatched position. In the latched position, drum rotation under the action of the spring 6 is prevented. In the latched position the drum can rotate in the opposite direction, against the action of the spring, to wind or pretension the spring. In the unlatched the drum can rotate in both directions.

The latch comprises a ratchet mechanism. A plurality of drum teeth 22 is located around a circumferential perimeter of the drum 5. Preferably a plurality of drum teeth 22 is located around an inner circumferential perimeter of the drum 5. A corresponding pawl 16 having at least one tooth 17 (although preferably two or more) is movably coupled to the body 2. In the latched position, the pawl engages with the drum teeth 22 to prevent rotation in the direction of the spring bias, but allow rotation of the drum in the opposite direction. Each drum tooth has a ramped side 23 and a stepped side 24, and each pawl tooth has a corresponding ramped side 18 and stepped side 19. Ramped sides 23, 18 are inclined at a substantial angle to the drum axis. Stepped sides 24, 19 are substantially parallel with the drum axis. In the latched position, the ramped surfaces 23, 18 slide over one another, the pawl movable in an axial direction with respect to the drum, allowing rotation of the drum against the spring bias. In the latched position, the stepped surfaces 24, 19 butt against one another preventing rotation of the drum in the biased direction.

The pawl engages with the drum teeth on an engagement plane, the engagement plane being normal to the drum axis of rotation. The pawl is adapted to move axially with respect to the drum axis for movement between the latched and unlatched positions.

The pawl is movably coupled to the body 2. In the preferred embodiment, the pawl is integrally formed with a movable portion 15 of the body. The moveable portion is arranged as a button 15 on one side of the body 2. Preferably button 15 is integrally formed to one side of the body 2. Button 15 flexes or bends about bend region 14 as a force is applied substantially normal to the surface of the button. Button 15 acts as a cantilever, the pawl being at an end of the cantilever distal to the bend region 14. The button 15 can be formed by cutting or removing a portion of the body 2 to provide a free portion that can move, bend or cantilever at the bend region 14. Alternatively, the body can be formed, for example by injection moulding, with button integrally formed with the body at the bend region.

Preferably the button is circular. Alternatively the button could be oval, square or other visually appealing shape. Preferably the button is circular and the diameter of the button is substantially equal to the diameter of the cylindrical surface 20 on which the drum 5 is radially supported. Preferably an outer circumference of the button 15 is coterminous with the cylindrical surface 20 on which the drum rotates. Preferably an outer circumference of the button 15 provides a cylindrical surface 20 on which the drum rotates. As the button 15 is depressed (into the page of FIG. 1) to the unlatched position to disengage the pawl from the drum teeth, the button and pawl are deflected further into an interior of the drum 5. The direction of movement of button 15 and pawl 16 from the latched to the unlatched position is best shown in the alternative embodiment of FIG. 11C by the direction of arrow C.

Inside surface 21 of the drum cylinder is preferably an inner circumferential side of the drum teeth 22.

The latch is preferably biased to the latch position. In the preferred embodiment, the movable portion 15 of the body is formed to engaged with the drum teeth in an un-deflected state. To disengage (unlatch) the pawl from the drum, the movable portion must be deflected into a stressed state.

Alternatively, the pawl may be movably attached to the body, for example in a pivoting or sliding arrangement with the body. Preferably a biasing element, such as a compression spring is disposed between the pawl and a side of the body to bias the pawl to the latched position.

Figure 6:
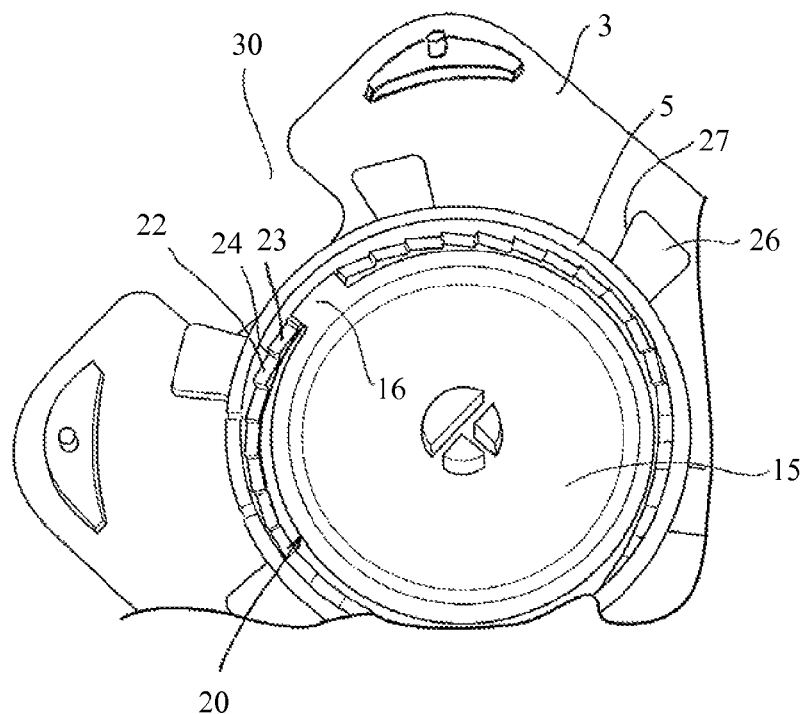
FIG. 6 is a part section of the flexible conduit storage device of FIG. 1 showing the drum component assembled onto the front half of the body with the back half of the body removed.

The movable pawl is preferably movably coupled to the side of the body to which the spring 6 is fixed. The drum teeth are engaged with the pawl as the drum is assembled onto the cylindrical surface 21 as shown in FIG. 6. The drum and spring can be assembled to one side of the housing. With all moving parts assembled to one side of the housing, assembly of the storage device is completed by attaching the other side of the body to the rest of the assembly. Alternatively, the pawl could be movably coupled to the opposite side of the body to which the spring 6 is fixed. Alternatively the pawl could be movably coupled to the opposite side of the body to which the cylindrical surface 20 is located. In this case, the cylindrical surface 20 is not coterminous with the movable portion 15.

Figure 7:
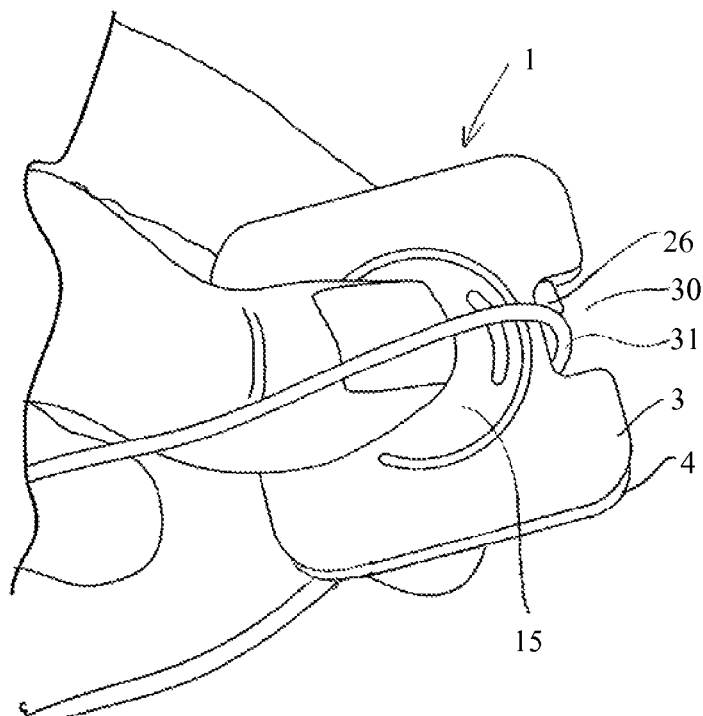
FIG. 7 shows an intermediate section of a flexible conduit positioned within an opening in the body of the flexible conduit storage device of FIG. 1.
Figure 8:
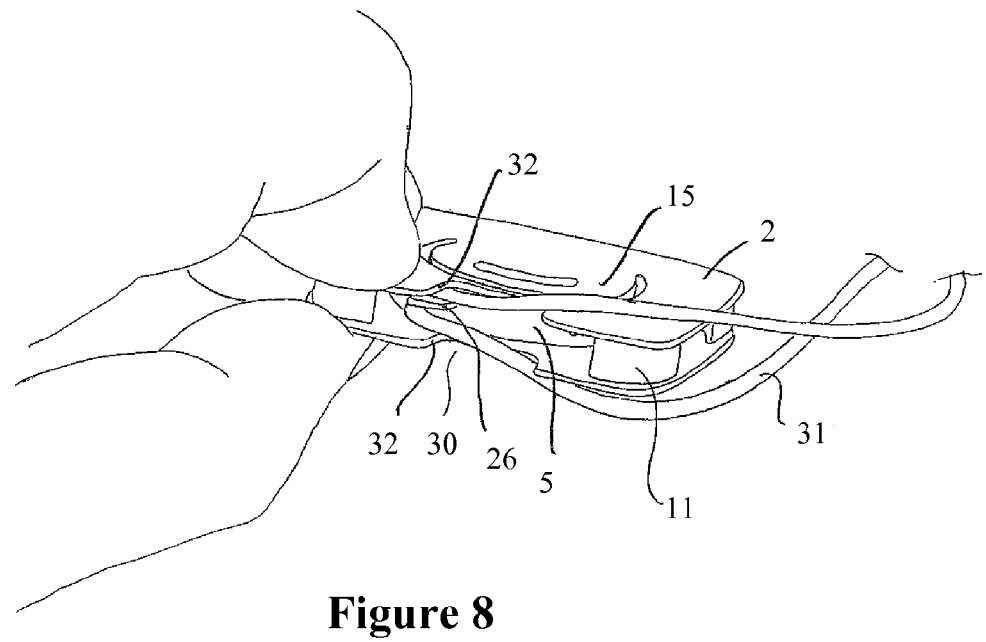
FIG. 8 shows a flexible conduit initially being pulled into the flexible conduit storage device of FIG. 1.
Figure 9:
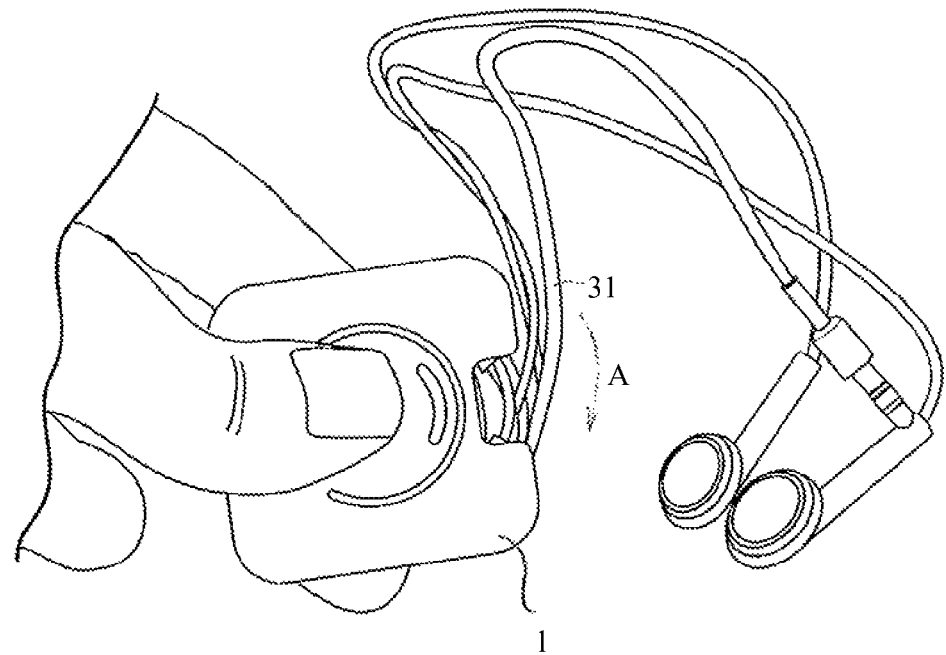
FIG. 9 shows a flexible conduit partially stored within the flexible conduit storage device of FIG. 1.

Referring to FIGS. 7-9, in use a flexible conduit is wound onto the outer cylindrical surface 25 of the drum under the action of the biasing element. In the preferred embodiment, a position of the conduit is engaged with the drum, the latch is moved to the unlatched position, and the drum winds (in the direction of arrow A in FIG. 9) the conduit onto the drum automatically under the action of the uncoiling coil spring. The coil spring is re-tensioned once the flexible conduit is pulled from the drum, the drum rotating against the bias of the spring as the conduit is unwound from the storage device 1.

The flexible conduit is attached to the drum via an engagement mechanism or coupling disposed on the drum. Preferably a plurality of couplings are disposed on the drum. In one embodiment of the storage device 1, a plurality of couplings 26 are disposed around the outer surface 25 of the drum. The couplings are formed as tines 26 spaced apart around the outer surface of the drum 5, the tines extending approximately radially from the outer surface of the drum. A flexible conduit is preferably engaged with the drum by positioning the flexible conduit forward of one tine in the biased direction of rotation. A position of the flexible conduit intermediate between two ends of the conduit is positioned in front of one tine. Once the latch is moved to the unlatched position, the drum 5 rotates in the biased direction, the tine catching the flexible conduit which is pulled onto the drum 2 as the drum rotates. The flexible conduit is doubled around the tine with which the conduit is engaged, the doubled up conduit being wound onto the drum.

The body has an opening 30 in which the flexible conduit is positioned in order to be engaged with a coupling of the drum 5. Preferably the opening is at one edge of the body, extending through the body from one side of the body to the other side of the body. The opening may be formed, for example, as a notch in each side part 3, 4 of the body, the notches being aligned, with at least the perimeter or edge of the body being open between the notches. Each tine cycles through the opening as the drum rotates, the tines being dimensioned to extend into the opening and be ex posed for catching a conduit positioned within the opening. Opening 30 provides a pathway to allow the flexible conduit to pass substantially parallel to the drum axis. The opening allows a flexible conduit 31 to be easily placed within the opening across the path of the tines as the drum rotates, as shown in FIG. 7. The tine in front of which the conduit has been placed will catch the conduit as the tine rotates through the opening 30.

As shown in FIG. 8, once the tine 26 catches the cord 31, the cord is folded in two around the tine as the cord hits the leading edges 32 of the sides of the opening 30. The conduit is automatically drawn into the storage device and around the drum as shown in FIG. 9, while the latch is maintained in the unlatched position.

Preferably a user will position the conduit within the opening 30 for engagement with a tine at approximately a mid point of the conduit. The conduit will be fully wound onto the drum once at least one of the two ends of the conduit is approximately adjacent the opening 30.

Preferably the tines have a sloping front edge 27 to assist with catching the flexible conduit as the drum rotates in the biased direction of rotation.

In the alternative but similar drum embodiment shown in FIG. 5*a*, the tines 26 are formed by approximately radial slots 26*a* formed in a circumferential flange extending from the outer surface 25 of the drum 5. Preferably the slots 26*a* are angled backwards relative to the biased rotational direction, so that the front edge 27 of tines 26 are sloping forward to assist with catching the flexible conduit as the drum rotates in the biased direction of rotation.

Figure 13:
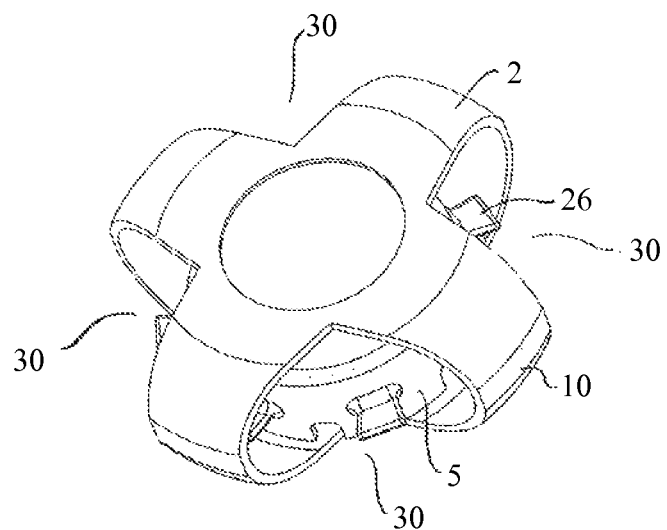
FIG. 13 is a perspective view of a flexible conduit storage device according to a fourth embodiment of the present invention.

In the alternative embodiment of FIG. 13, the body or frame 2 is provided with a plurality of openings 30. Each opening 30 extends through the frame or body from one side of the body to the other. In this embodiment, each opening is a wedge portion through the body at an edge 10 of the body.

Figure 10:
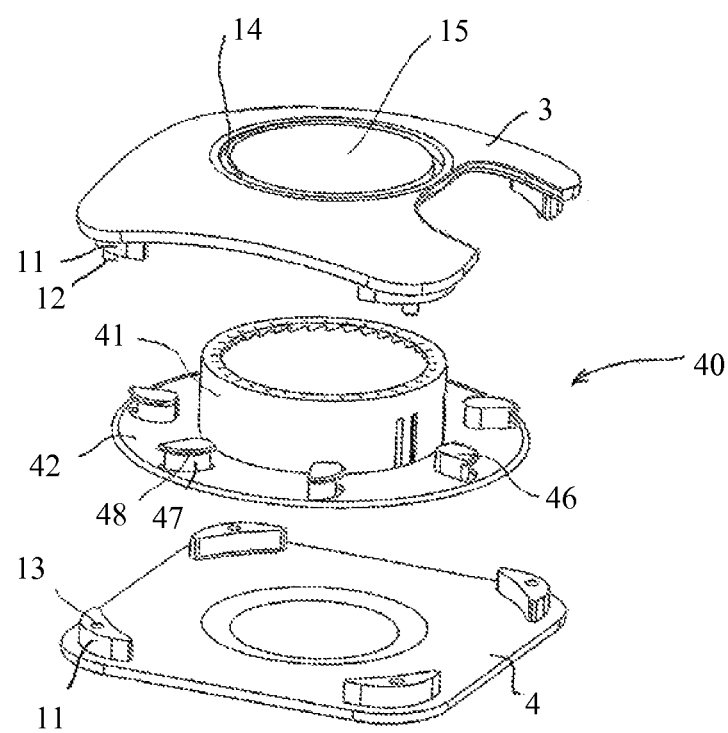
FIG. 10 is a partly exploded view of a flexible conduit storage device according to a third embodiment of the present invention.

In an alternative embodiment, the drum of FIG. 10 includes flange 42 attached to or integrally formed at one side of the drum 40. Flange 42 extends outwardly of the outer drum surface 41. Couplings 46 are attached to or integrally formed with the flange. Couplings 46 are spaced circumferentially around the flange at a radial position intermediate between the outer drum surface 41 and the circumferential perimeter of the flange. Couplings 46 extend in an axial direction with respect to the drum, from flange 42 towards the opposite side of the drum distal from the flange.

Each coupling 46, provides a surface 47 a round which an intermediate section of flexible conduit may catch. Surface 47 faces forward in the rotationally biased direction. Preferably surface 47 is curved, to provide a bend radius for the flexible conduit to bend about. Preferably each coupling includes a lip 48. Lip 48 is attached to or integrally formed with the coupling at an end of the coupling distal from the flange 42. Lip 48 extends along a perimeter of surface 47 and extends forward of surface 47 in the biased direction of rotation. Lip 48 assists to maintain engagement of an intermediate section of the flexible conduit with a coupling 46.

Figure 1B:
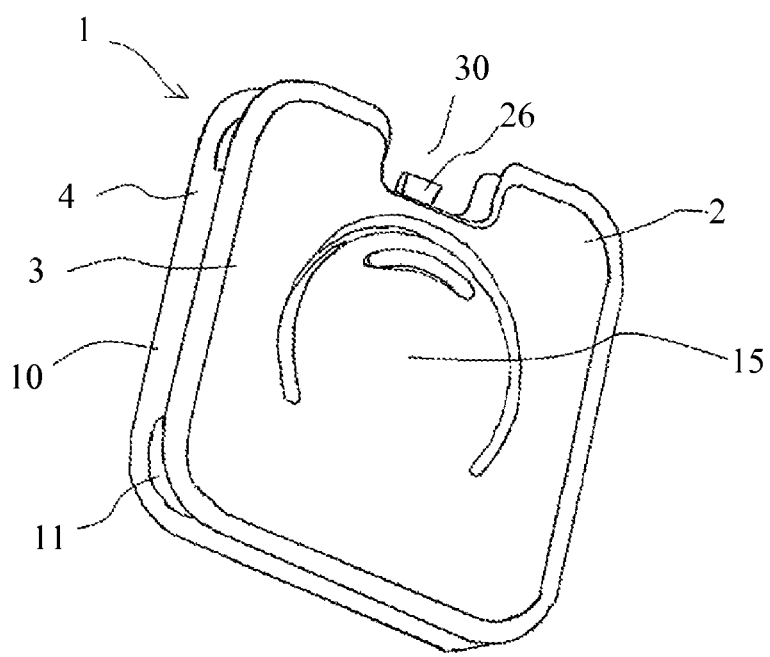
Figure 2A:
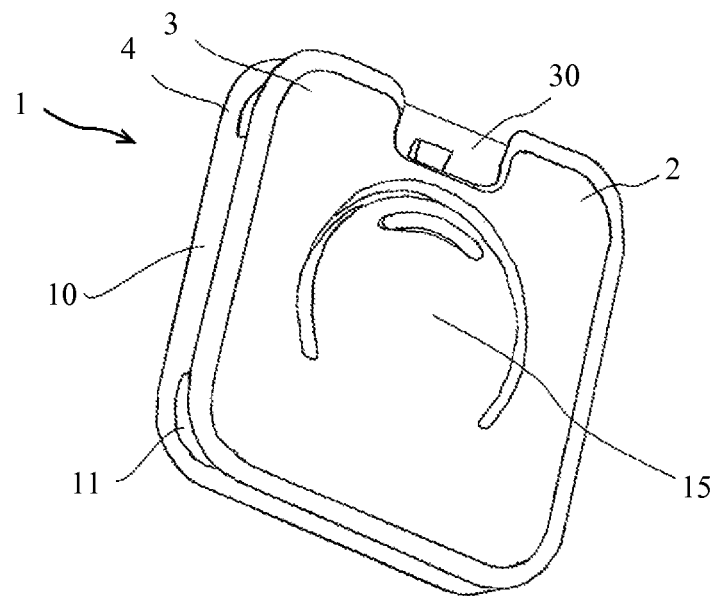
FIGS. 2a and 2b are perspective views of a flexible conduit storage device according to a second embodiment of the present invention.
Figure 2B:
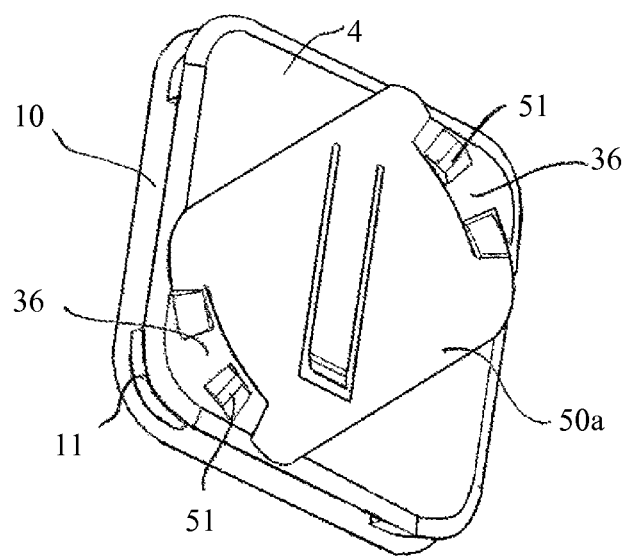

As described in relation to the embodiment of FIG. 1, opening 30 is at one edge of the body, extending through the body from one side of the body to the other side of the body. In the alternative embodiments of FIGS. 2A, 2B, 10 and 11A to 11C, the opening 30 does not extend through the body from one side of the body to the other side of the body. For example, the embodiment of FIGS. 11A to 11C, has opening 30 at an edge or perimeter portion of the body and extending through one side of the body only. The opening may be formed, for example, as a notch in one side part 3,4 of the body with the perimeter or edge of the body being open at least adjacent the notch, as best shown in FIGS. 2A, 10 and 11A.

Figure 11A:
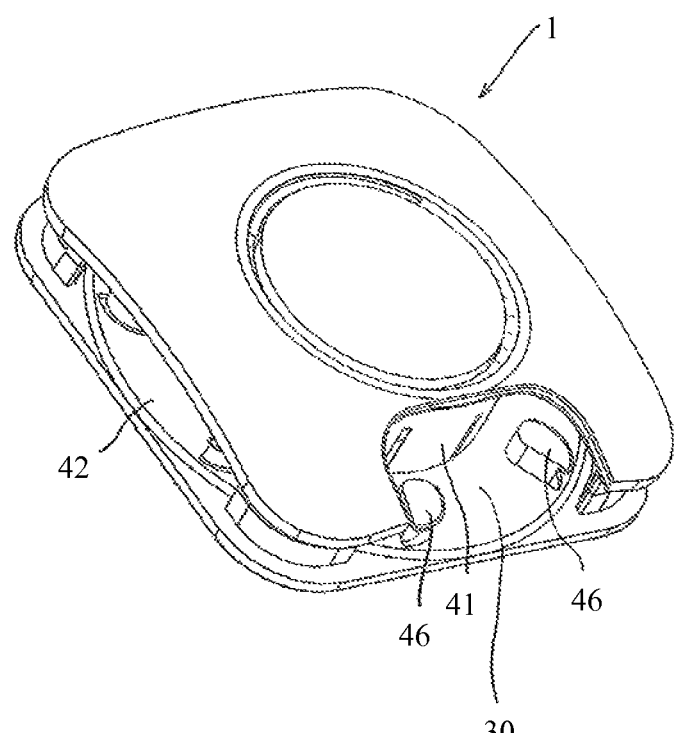
FIGS. 11a to 11c are perspective views of the flexible conduit storage device of FIG. 10.

Drum 40 is positioned to face the couplings towards the opening 30 in the side and edge perimeter of the body, as best shown in FIG. 11A, to expose the couplings to the outside of the body as the couplings 46 cycle through the opening 30. As the drum 40 rotates, couplings 46 cycle through opening 30 to be exposed to the outside of the body.

Figure 11B:
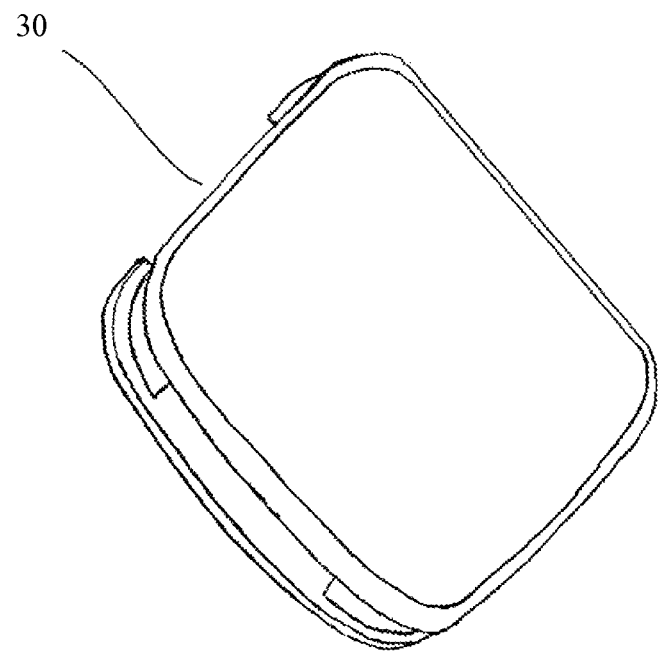
Figure 11C:
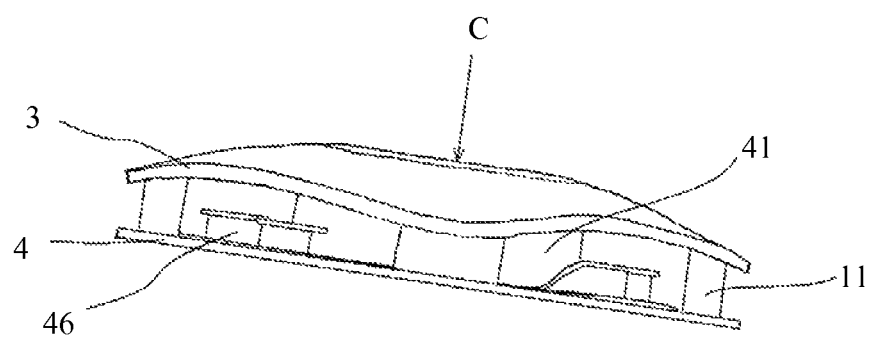

When using the storage device of FIGS. 11A to 11C, a flexible conduit is coiled in to the storage device by initially looping or hooking an intermediate section of the flexible conduit about one coupling 46 within the opening 30. Once the conduit is engaged with a coupling, the latch is released to coil the doubled up conduit a bout the drum cylindrical surface 41. The opening 30 in the side of the body is sufficiently large to allow a user to easily engage a cord with a coupling 46.

The biased direction of rotation of the drum of the embodiment of FIGS. 11A to 11C is opposite to the biased direction of rotation of the drum of the embodiment of FIG. 1. The biased direction of rotation is not important to the present invention and depends only on the arrangement of the biasing element 6 with respect to the drum 5, 40 and body 2. However, the couplings 26, 46 are preferably directionally shaped with respect to the biasing direction, for example the leading edge or surfaces being sloped forward, or curved, or both, as previously described.

The drum flange 42 may be used as a thumb wheel for winding the drum to re-tension the spring should the spring tension be released without winding a cord onto the drum. The perimeter of the flange 42 may extend outside at least a portion of the perimeter of the body 2 so that a user may turn the drum by sliding the user's thumb or finger along an edge of the storage device while contacting the perimeter of the drum flange to rotate the drum. The perimeter of the drum flange may be notched or knurled to provide friction against the users thumb to assist with rotation of the drum.

The embodiments of FIGS. 1 and 2 may also include a thumb wheel (not shown) for re-tensioning the spring should spring tension be released prior to winding a cord onto the drum. The thumb wheel (not shown) may be attached to or integrally formed at one side of the drum 5, extending outwardly from the outer drum surface 25. Alternatively, the tines 26 may extend outside at least a portion of the perimeter of the body 2 so that a user may turn the drum by sliding the user's thumb or finger a long an edge of the storage device while contacting one or more tines 26 to rotate the drum 5.

Figure 14:
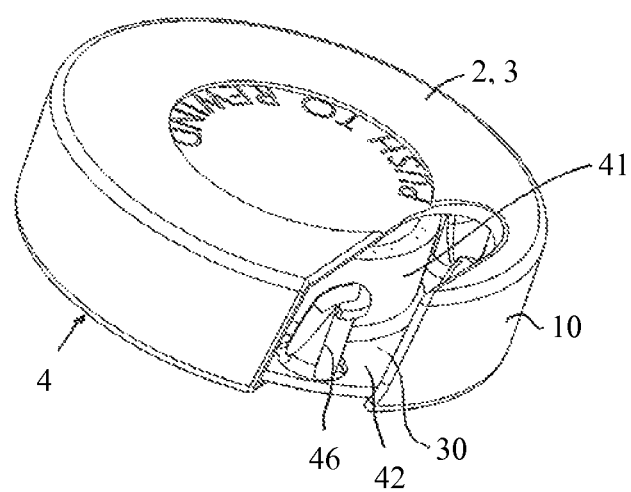
FIG. 14 is a perspective view of a flexible conduit storage device according to a fifth embodiment of the present invention.

In the alternative embodiment of FIG. 14, the body or frame 2 does not include a fully open perimeter or edge. Rather, the perimeter or edge 10 is closed except at the opening 30. The perimeter portion 10 may integrally formed with and extend from one side 3, or the opposite side, of the body 2. The opening extends through a side 3 of the body 2. The opening can extend through an opposite side 4 of the body (hidden from view in FIG. 14), however, the flange 42 obscures the opening on this side of the body. The opening can be at the edge of the body extending into one side of the body only. As shown in FIG. 14, the opening in the side of the body can be shaped to assist with guiding a conduit for winding onto the drum outer surface 41. The opening in the side of the body is sufficiently large to allow a user to easily engage a cord with a coupling 46.

Figure 15:
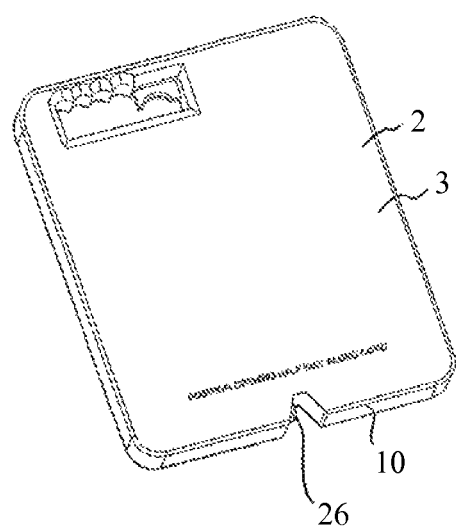
FIG. 15 is a perspective view of a flexible conduit storage device according to a sixth embodiment of the present invention.

In a further alternative embodiment as shown in FIG. 15, the perimeter or edge 10 is closed except at the opening 30. The perimeter portion 10 may integrally formed with and extend from one side 3, or the opposite side, of the body 2. The perimeter portion 10 extends around the perimeter of the body except for the opening 30. Preferably the opening is at one edge of the body, extending through the body from one side of the body to the other side of the body. The opening may be formed, for example, as a notch in each side of the body, the notches being aligned, with the perimeter or edge of the body being open between the notches. Each tine 26 cycles through the opening 30 as the drum rotates, the tines being dimensioned to extend into the opening and be exposed for catching a conduit positioned within the opening. Opening 30 provides a pathway to allow the flexible conduit to pass substantially parallel to the drum axis. The opening allows a flexible conduit to be easily placed within the opening across the path of the tines as the drum rotates.

The embodiment of FIG. 15 includes a handle hole 60 for a user's hand to grasp the flexible conduit storage device. At rigger 61 is adapted to release a pawl from corresponding drum teeth to allow a biased drum to wind a flexible conduit into the storage device. The storage device of FIG. 15 is significantly larger in size compared to the storage device of FIGS. 7 to 9. The storage device of FIG. 15 has internal parts similar to the embodiment of FIG. 1a. The storage device of FIG. 15 may be adapted to store, for example, a hydraulic hose or an electrical appliance power cord.

With reference to FIGS. 1A, 2A, 11A, and 13-15, opening 30 provides at least one leading edge 32 aligned transverse to the rotational axis of the drum. Leading edge 32 is aligned transverse to the rotational axis of the drum and extends from the perimeter of the body to a position intermediate between the perimeter of the body and the drum rotational axis. For example, in an alternative embodiment, the leading edge 32 may be approximately radial with respect to the drum centre. As the drum rotates, coupling 26, 46 cycles through an area extending longitudinally from the leading edge 32 with respect to the drum axis.

When coiling a conduit into a storage device according to the present invention, the drum will continue to wind the cord onto the drum until the storage device is full, the conduit preventing further rotation of the drum, or until the latch is returned to the latched position, or until the cord is wound onto the drum and at least one end of the cord, such as the head phones or jack of a set of personal head phones, collides with opening 30 preventing further rotation of the drum.

The storage device may include a friction or resistance device to control the rate of rotation when coiling the conduit into the storage device. The friction or resistance device provides a damping effect, to prevent the drum component 5, 40 rotating at excessive speed.

In order to remove a flexible conduit from the storage device, a user simply pulls the cord from the device, causing the drum to rotate against the bias of the spring, the ratchet mechanism allowing the drum to rotate in the unwind direction with the latch in the latched position. As the conduit is wound out from the device 1, the spring is re-tensioned for subsequent use.

A storage device according to the present invention is adapted to store a flexible conduit that is separate to the device. For example, a user may use the storage device to store the cord of any set of personal head phones. The conduit is not fixed to the storage device assembly. The flexible conduit is not a component of the storage device.

A storage device according to the present invention is simple and compact comprising a minimal number of parts. The small number of parts results in lower manufacturing costs. In a preferred embodiment, the storage device includes only four separate parts, two side body parts, the drum and the biasing element. The small number of parts allows the storage device to be compact. For example, one embodiment of the present invention applied to a storage device for storing the cord of a set of personal headphones measures approximately 46 mm×46 mm×11 mm.

Furthermore, the compact simple design results in a light weight assembly. A user may completely withdraw the conduit from the storage device for use. Alternatively, due to the light weight configuration of the storage device, a user may only withdraw a length of conduit necessary for use, and use the conduit and storage device together, an intermediate section of the conduit still wound around the drum of the storage device.

A user may wish to attach the storage device to another device, such as a portable audio device, for example an MP3 player, or mobile telephone, or to an item of clothing such as a shirt pocket or a belt. To achieve this, one side of the body includes two pairs of holes 35 as shown in FIG. 3A. The pairs of holes are centred about a common centre point 37, each hole being spaced apart circumferentially and arranged in two pairs 35. The two pairs are preferably diametrically opposed about the centre point 37.

Figure 12A:
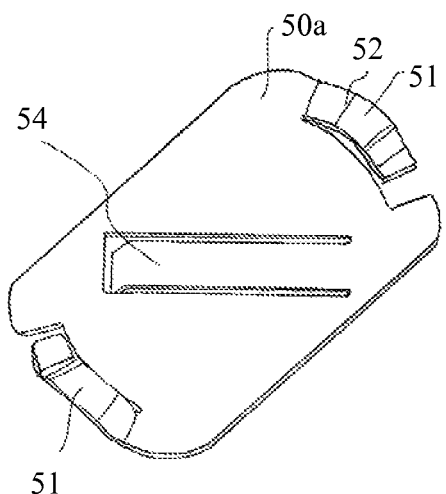
FIGS. 12a and 12b are perspective views of two different forms of a clip plate for use with a storage device according to the present invention.
Figure 12B:
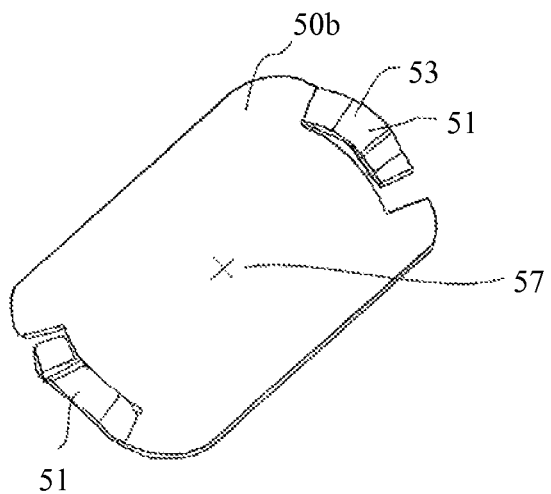

A clip plate, for example 50a or 50b of FIGS. 12A and 12B, is attached to the storage device via two clip sections 51, each clip section engaging with a pair of holes 35 in the storage device body 2. Each clip section extends circumferentially from the clip plate 50a, 50b about a common centre point 57.

In order to attach the clip plate 50a, 50b to the body, centre 57 of curvature of clips 51 is aligned with the centre 37 of curvature of holes 35 in the body 2 such that clips 51 interface with corresponding holes 35. The clip plate and body 2 are rotated relative to one another so that each clip 51 passes through a first hole 35a, under a section 36 of the body between holes 35a and 35b, and through or into second hole 35 b. Each clip section has a number of bends 52 to bend a middle section 53 of each clip out of plane of the clip plate to assist with threading the clip through a pair of holes 35. A clip plate 50a is shown attached to storage device 1 in FIG. 2B.

Alternatively, a clip plate may be attached to the body via a push fit attachment. For example, a clip plate may comprise a perimeter flange extending around at least a portion of the perimeter of the clip plate, the perimeter flange being adapted to engage with at least a perimeter portion of the body. Alternatively, the clip plate may include pegs or cut out portions formed substantially normal to the general plane of the clip plate for engagement with corresponding holes in the body of the storage device.

Clip plate 50a includes a clip 54 for attaching the clip plate and attached storage device to a users clothing or other convenient article. This allows the storage device to be used hands free together with a flexible conduit. The alternative clip plate 50b is without a clip 54 and is intended to be fixed to a portable device such as a mobile phone or personal audio device by a non permanent adhesive.

Clip plate 50a, 50b is preferably manufactured from metal. Alternatively clip plate 50a, 50b is manufactured from hard plastic. Body and drum components are preferably manufactured from hard plastic.

The foregoing description of the invention includes preferred forms thereof. Modifications may be made thereto without departing from the scope of the invention.

The invention claimed is:

1. A device for storing a flexible conduit, the device comprising:
   a body enclosing a drum;
   the drum rotationally coupled to the body and biased to rotate in a first direction,
   a latch movable between a latched position and an unlatched position, wherein in the latched position the drum is prevented from rotating in the first direction, wherein the latch is a ratchet comprising a pawl and corresponding drum teeth, the pawl engaging with the drum teeth when in the latched position, the pawl being integrally formed with a movable portion of the body, the movable portion being a cantilever bending about a bend region, the pawl being at an end of the cantilever distal from the bend region;

an opening in the body for positioning a portion of the flexible conduit within the body and at an outer edge of the drum;

at least one coupling disposed on the drum, the coupling adapted to extend into the opening for catching a portion of the flexible conduit positioned within the opening; and when the latch is in the unlatched position the drum rotates in the first direction to cycle the coupling through the opening, a said coupling catching the flexible conduit positioned within the opening to wind the flexible conduit onto the drum.

2. The device as claimed in claim 1 wherein the opening is at an edge of the body and extends through the body from one side of the body to another side of the body.

3. The device as claimed in claim 2 wherein the opening allows a pathway for the flexible conduit to pass substantially parallel to the drum axis across the path of the couplings as the drum rotates.

4. The device as claimed in claim 1 wherein the at least one coupling is a tine extending radially from an outer circumference of the drum.

5. The device as claimed in claim 4 wherein the leading edge of the tine is sloping forward in the direction of the first rotational direction.

6. The device as claimed in any one of claims 1 to 5 wherein there are a plurality of couplings spaced apart around an outer circumference of the drum.

7. The device as claimed in claim 1 wherein in use the flexible conduit is wound onto an outer circumference of the drum on which the at least one coupling is disposed.

8. The device as claimed in claim 1 wherein the drum includes a flange extending radially from a side of the drum, the at least one coupling being attached to the flange at a radial position intermediate between a drum outer surface and a circumferential perimeter of the drum.

9. The device as claimed in claim 8 wherein the at least one coupling extends in an axial direction from the flange towards an opposite side of the drum distal from the flange.

10. The device as claimed in claim 9 wherein the at least one coupling has a curved surface for catching a portion of a flexible conduit, the curved surface facing forwards in the first direction of rotation.

11. The device as claimed in claim 9 wherein the at least one coupling includes a lip at an end of the coupling distal from the flange, the lip adapted to assist with maintaining engagement of a portion of a flexible conduit with a said coupling.

12. The device as claimed in any one of claims 8 to 11 wherein the device includes a plurality of couplings, the couplings being spaced apart circumferentially around the flange.

13. The device as claimed in claim 1 wherein the opening is at an edge or perimeter of the body and extending through one side of the body.

14. The device as claimed in claim 1 wherein the drum is radially supported by a cylindrical surface, and the movable portion has an outer diameter substantially coterminous with the cylindrical surface.

15. The device as claimed in claim 14 wherein the drum is radially supported by the outside diameter of the movable portion when the movable portion and pawl are deflected further into the drum when being moved from the latched position to the unlatched position.

16. The device as claimed in claim 1 wherein the latch is biased to the latched position.

17. The device as claimed in claim 1 wherein the pawl engages with the drum teeth on an engagement plane, the engagement plane being normal to the drum axis of rotation.

18. The device as claimed in claim 17 wherein the pawl is adapted to move axially with respect to the drum access for movement between the latched and unlatched positions.

19. The device as claimed in claim 1 wherein in use an intermediate portion of a flexible conduit engages with a said coupling, the flexible conduit doubling around said coupling and the doubled up flexible conduit being wound onto the drum as the drum rotates in the first direction of rotation.

20. The device as claimed in claim 19 wherein when rotating in the first direction, a said coupling engages with a flexible conduit positioned within the opening, the flexible conduit initially hitting leading edges of the opening to double the flexible conduit around the coupling and automatically draw the flexible conduit onto the drum.

21. The device as claimed in claim 1 wherein the drum is biased in the first direction of rotation by a coil spring, a position of the coil spring being fixed to the drum and another position of the coil spring being fixed to the body.

22. The device as claimed in claim 21 wherein a portion of the coil spring resides within the drum.

23. The device as claimed in claim 21 wherein rotation of the drum in a direction opposite to the first direction pretensions the coil spring.

24. The device as claimed in claim 23 wherein a flexible conduit is unwound from the drum by pulling the flexible conduit from the storage device to rotate the drum in a direction opposite to the first direction thereby re-tensioning the coil spring for subsequent use.

25. The device as claimed in claim 1 wherein the pawl is movably coupled to a side part of the body, and the coil spring is fixed to the same side part of the body.

26. The device as claimed in claim 1 wherein the body is adapted to attach to a clip plate, the clip plate adapted for attachment to a user's clothes or another device.

27. The device as claimed in claim 26 wherein the body attaches to the clip plate by rotational engagement.

28. The device as claimed in claim 27 wherein the clip plate attaches to the body via at least two clip sections, each clip section extending circumferentially from the clip plate about a first centre point, and the body having a plurality of holes, each said hole being spaced apart circumferentially and centred about a second centre point and arranged into pairs, and in use the first and second centre points being aligned to align a clip section with a corresponding pair of holes for engagement.

29. The device as claimed in claim 1 wherein the device is adapted to store the flexible conduit that is separate from the device.

30. The device as claimed in claim 1 wherein the body has two side parts spaced apart by columns.

31. The device as claimed in claim 30 wherein the body has an open perimeter between two side parts except for the columns located at or near the perimeter of the body.

32. The device as claimed in claim 31 wherein the body has four corner columns.

33. The device as claimed in claim 32 wherein an inside surface of each column is curved, the inside curved surface of the four columns having a common center of curvature, the drum rotation being centered on the common center of curvature.

34. The device as claimed in claim 1 wherein the body is a housing and the drum is rotationally coupled within the housing.

35. A device for storing a flexible conduit, the device comprising:
 a body enclosing a drum and comprising two opposing side parts;
 the drum rotationally coupled to the body;
 one or more couplings disposed on the drum for catching a flexible conduit;
 a biasing element to bias the drum for rotation;
 a generally U-shaped cutout extending from the periphery of at least one of the sides parts for positioning a vertical portion of the flexible conduit within the body and at an outer edge of the drum with the axis of the drum vertically disposed and for exposing one or more said couplings for catching the flexible conduit positioned in the cutout;
 wherein the drum can be latched to prevent rotation, and unlatched to allow rotation of the drum to cycle the couplings through the cutout in response to motivation by the biasing element.

36. A device for storing a flexible conduit, the device comprising:
 a body enclosing a drum and comprising two opposing side parts;
 a drum rotationally coupled to the body and biased to rotate in a first direction,
 a latch movable between a latched position and an unlatched position, wherein in the latched position the drum is prevented from rotating in the first direction,
 a biasing element biasing the drum for rotation;
 a generally U-shaped cutout extending from the periphery of at least one of the sides parts for positioning a vertical portion of the flexible conduit within the body and at an outer edge of the drum with the axis of the drum vertically disposed;
 a plurality of couplings disposed on the drum, the couplings adapted to extend into the cutout for catching a portion of the flexible conduit positioned within the cutout; and
 when the latch is in the unlatched position the drum rotates in the first direction in response to motivation by the biasing element to cycle the couplings through the cutout, a said coupling catching the flexible conduit positioned within the cutout to wind the flexible conduit onto the drum and the drum rotates in a second direction opposite the first direction in response to the flexible conduit being pulled from the cutout, the rotation of the drum in the second direction biasing the biasing element.

37. A device for storing a flexible conduit, the device comprising:
 a body enclosing a drum and comprising two opposing side parts;
 the drum rotationally coupled to the body and biased to rotate in a first direction;
 a latch movable between a latched position and an unlatched position, wherein in the latched position the drum is prevented from rotating in the first direction;
 a biasing element biasing the drum for rotation;
 a generally U-shaped cutout extending from the periphery of at least one of the sides parts for positioning a vertical portion of the flexible conduit within the body and at an outer edge of the drum with the axis of the drum vertically disposed, the cutout being at an edge of the body and extending through the body from one side of the body to another side of the body to allow a pathway for the flexible conduit to pass substantially parallel to a drum axis across the path of the coupling as the drum rotates; and
 at least one coupling disposed on the drum, the coupling adapted to extend into the cutout for catching a portion of the flexible conduit positioned within the cutout; and
 when the latch is in the unlatched position the drum rotates in the first direction in response to motivation by the biasing element to cycle the coupling through the cutout, a said coupling catching the flexible conduit positioned within the cutout to wind the flexible conduit onto the drum and the drum rotates in a second direction opposite the first direction in response to the flexible conduit being pulled from the cutout, the rotation of the drum in the second direction biasing the biasing element.

38. A device for storing a flexible conduit, the device comprising:
 a body enclosing a drum and comprising two opposing side parts;
 the drum rotationally coupled to the body and biased to rotate in a first direction,
 a latch movable between a latched position and an unlatched position, wherein in the latched position the drum is prevented from rotating in the first direction;
 a biasing element biasing the drum for rotation;
 a generally U-shaped cutout extending from the periphery of at least one of the sides parts for positioning a vertical portion of the flexible conduit within the body and at an outer edge of the drum with the axis of the drum vertically disposed, the cutout being at an edge of the body and extending through the body from one side of the body to another side of the body to allow a pathway for the flexible conduit to pass substantially parallel to the drum axis across the path of the coupling as the drum rotates;
 at least one coupling disposed on the drum, the coupling adapted to extend into the cutout for catching a portion of the flexible conduit positioned within the cutout, the at least one coupling being a tine extending radially from an outer circumference of the drum; and
 when the latch is in the unlatched position the drum rotates in the first direction in response to motivation by the biasing element to cycle the coupling through the cutout, a said coupling catching a flexible conduit positioned within the cutout to wind the flexible conduit onto the drum.

39. A device for storing a flexible conduit, the device comprising:
 a body enclosing a drum, and comprising two opposing side parts wherein the body is adapted to attach to a clip plate by rotational engagement, the clip plate adapted for attachment to a user's clothes, wherein the clip plate attaches to the body via at least two clip sections, each clip section extending circumferentially from the clip plate about a first centre point, the body having a plurality of holes, each said hole being spaced apart circumferentially and centred about a second centre point and arranged into pairs, in use the first and second centre points being aligned to align a clip section with a corresponding pair of holes for engagement;

the drum rotationally coupled to the body and biased to rotate in a first direction, a latch movable between a latched position and an unlatched position, wherein in the latched position the drum is prevented from rotating in the first direction;

a generally U-shaped cutout extending from the periphery of at least one of the sides parts for positioning a portion of the flexible conduit within the body and at an outer edge of the drum;

at least one coupling disposed on the drum, the coupling adapted to extend into the cutout for catching a portion of the flexible conduit positioned within the cutout; and when the latch is in the unlatched position the drum rotates in the first direction to cycle the coupling through the cutout, a said coupling catching the flexible conduit positioned within the opening to wind the flexible conduit onto the drum.

* * * * *